United States Patent
Lee et al.

(10) Patent No.: US 11,362,953 B2
(45) Date of Patent: Jun. 14, 2022

(54) METHOD AND APPARATUS FOR CONTROLLING CONGESTION

(71) Applicant: Ulsan National Institute of Science and Technology, Ulsan (KR)

(72) Inventors: Kyunghan Lee, Ulsan (KR); Shinik Park, Ulsan (KR)

(73) Assignee: Ulsan National Institute of Science and Technology, Ulsan (KR)

( * ) Notice: Subject to any disclaimer, the term of this patent is extended or adjusted under 35 U.S.C. 154(b) by 164 days.

(21) Appl. No.: 16/686,538

(22) Filed: Nov. 18, 2019

(65) Prior Publication Data

US 2020/0162389 A1 May 21, 2020

(30) Foreign Application Priority Data

Nov. 20, 2018 (KR) .......................... 10-2018-0143779

(51) Int. Cl.
*H04W 28/02* (2009.01)
*H04L 43/0852* (2022.01)
*H04L 47/11* (2022.01)
*H04L 47/12* (2022.01)

(52) U.S. Cl.
CPC .......... *H04L 47/14* (2013.01); *H04L 43/0852* (2013.01); *H04L 47/11* (2013.01); *H04L 47/12* (2013.01)

(58) Field of Classification Search
CPC ..... H04L 47/14; H04L 43/0852; H04L 47/11; H04L 47/12; H04L 47/283; H04L 47/27; H04L 47/127; H04L 47/193; H04L 43/0894
See application file for complete search history.

(56) References Cited

U.S. PATENT DOCUMENTS

| 10,492,097 | B2 * | 11/2019 | Lee ................... H04W 28/0247 |
| 2013/0114408 | A1 * | 5/2013 | Sastry ..................... H04L 47/27 370/231 |
| 2016/0315841 | A1 * | 10/2016 | Kang .................... H04L 47/283 |
| 2018/0026898 | A1 | 1/2018 | Lee et al. |
| 2018/0262430 | A1 * | 9/2018 | Testicioglu ........... H04L 47/125 |
| 2020/0267083 | A1 * | 8/2020 | Os ....................... H04L 43/0876 |

FOREIGN PATENT DOCUMENTS

| KR | 10-1425300 B1 | 7/2014 |
| KR | 10-2014-0128849 A | 11/2014 |
| KR | 10-2016-0092737 A | 8/2016 |
| WO | WO-2016122225 A1 * | 8/2016 ........ H04W 28/0289 |

* cited by examiner

*Primary Examiner* — Donald L Mills
(74) *Attorney, Agent, or Firm* — Maier & Maier, PLLC (57) ABSTRACT

A method, performed by a receiver, for controlling congestion, including receiving packets from a transmitter, determining a maximum transmission rate of the received packets; determining a minimum packet delay of the received packets; determining characteristics of a congestion window of next packets to be received from the transmitter based on the maximum transmission rate and the minimum packet delay; and transmitting information on the determined characteristics of the congestion window to the transmitter.

14 Claims, 5 Drawing Sheets

METHOD AND APPARATUS FOR CONTROLLING CONGESTION

CROSS-REFERENCE TO RELATED APPLICATION

This application is based on and claims priority from Korean Patent Application No. 10-2018-0143779, filed on Nov. 20, 2018, the disclosure of which is incorporated herein in its entirety by reference for all purposes.

FIELD

The present disclosure relates to a method and an apparatus for controlling congestion based on a receiver in a network.

BACKGROUND

Network performance naturally decreases as the number of packets for data transmission in a network environment increases. The rapid deterioration of the performance may be referred to as "congestion". A solution to the congestion problem may be referred to as "congestion control".

Conventionally, the congestion is controlled by a loss-based congestion control method as a default in which the amount of data transmission increases until queues of the network are filled with transmitted/received packets and packet loss occurs.

The loss-based congestion control methods is advantageous in that it can achieve a maximum transmission rate that can be provided by a network, but is disadvantageous in that the queues of the network are unnecessarily filled and the communication with all devices that share the queues of the network may delay.

Although the drawbacks of the loss-based congestion control method may occur in both of a general network environment and a mobile network environment, the queueing delay is more remarkable in the mobile cellular network in which a buffer size is large with respect to a network capacity than in the general network environment.

Therefore, there is a demand for a congestion control method that allows a network to be effectively used and data to be transmitted/received without loss of a transmission rate of the network while considering a general network environment and a mobile cellular network.

SUMMARY

In view of the above, the present disclosure provides a method and an apparatus for controlling congestion which are implemented in a receiver while considering characteristics of a highly variable mobile cellular network environment and allow a network to be effectively used and data to be transmitted/received without loss of a transmission rate of the network.

The drawbacks to be solved by the present disclosure are not limited to the aforementioned drawbacks, and other drawbacks that are not mentioned will be clearly understood by those skilled in the art.

The method and the apparatus for controlling congestion according to the embodiment of the present disclosure are implemented in a receiver, and thus can perform congestion control by controlling the receiver and allow data to be transmitted/received without a loss of a transmission rate of a network while minimizing the delay in the network.

The drawbacks to be solved by the present disclosure are not limited to the aforementioned drawbacks, and other drawbacks that are not mentioned will be clearly understood by those skilled in the art.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Figure 1:
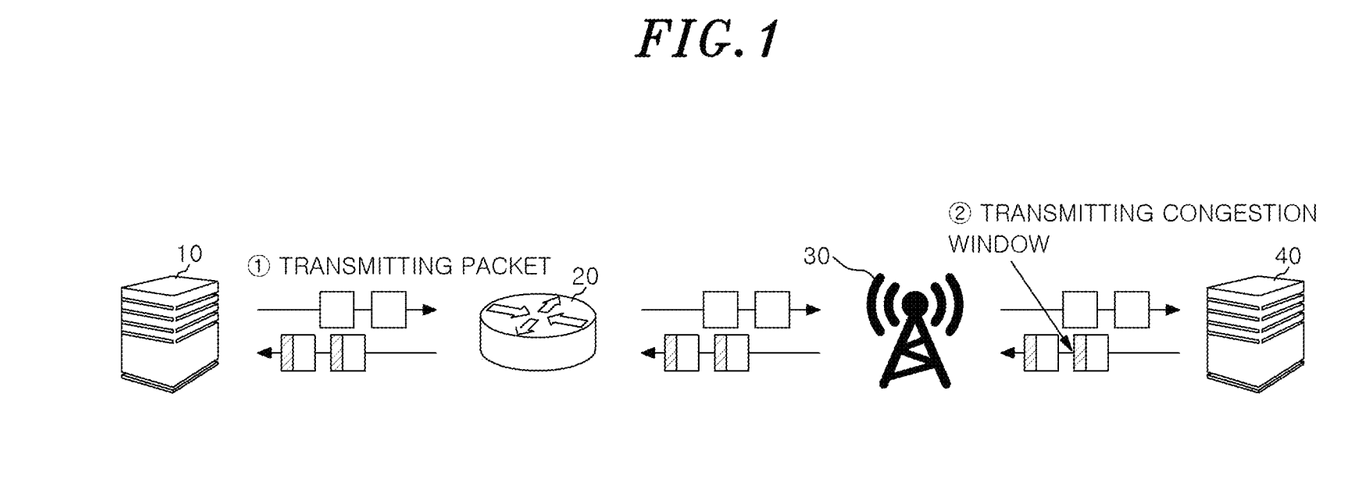
FIG. 1 is a conceptual diagram of a congestion control method according to an embodiment of the present disclosure.

FIG. 1 is a conceptual diagram of a congestion control method according to an embodiment of the present disclosure.

Referring to FIG. 1, the transmitter 10 can transmit a packet to a receiver 40. At this time, the transmitter 10 can transmit a packet to the receiver 40 via a router 20 and a base station 30. The receiver 40 that has received the packet can provide information on characteristics of a congestion window by transmitting acknowledgment (hereinafter, referred to as "ACK") to the transmitter 10. Here, the congestion window can indicate the number of packets transmitted by the transmitter 10 until the receiver 40 transmits the ACK to the transmitter 10. In other words, the congestion window can indicate the number of packets that can be continuously received by the receiver 40.

More specifically, the receiver 40 may include a congestion control apparatus according to an embodiment of the present disclosure, and can provide information on congestion control using the congestion control apparatus to the transmitter 10.

For example, the congestion control apparatus of the receiver 40 can determine a maximum transmission rate and a minimum packet delay of the received packet. The congestion control apparatus can determine characteristics of the congestion window of a next packet to be received from the transmitter 10 based on the maximum transmission rate and the minimum packet delay.

The congestion control apparatus can transmit the information on the determined characteristics of the congestion window from the receiver 40 to the transmitter 10. More specifically, the congestion control apparatus can transmit the information on the characteristics of the congestion window which is included in the ACK from the receiver 40 to the transmitter 10. The transmitted ACK can be ultimately transmitted to the transmitter 10 via the base station 30 and the router 20.

The transmitter 10 that has received the ACK can identify the information on the reception of the packet included in the ACK and provide the next packet to the receiver 40. More specifically, the transmitter 10 that has received the ACK can control the transmission of the next packet depending on the characteristics of the congestion window included in the ACK.

For example, on the assumption that the characteristics of the congestion window included in the ACK are the characteristics of the size of the congestion window, and the size is 1, the transmitter 10 can transmit only one packet 40 to the receiver 40 and then transmit a next packet after ACK of the transmitted packet is received from the receiver 40.

The method and the apparatus for controlling congestion to be described later control congestion related to data transmitted/received on a wireless network or wired network. The wireless network may include cellular network, e.g., 5G, long term evolution (LTE), 4G, 3G, or the like and Wi-fi and the wired network may include a network connected through the enthernet.

Figure 2:
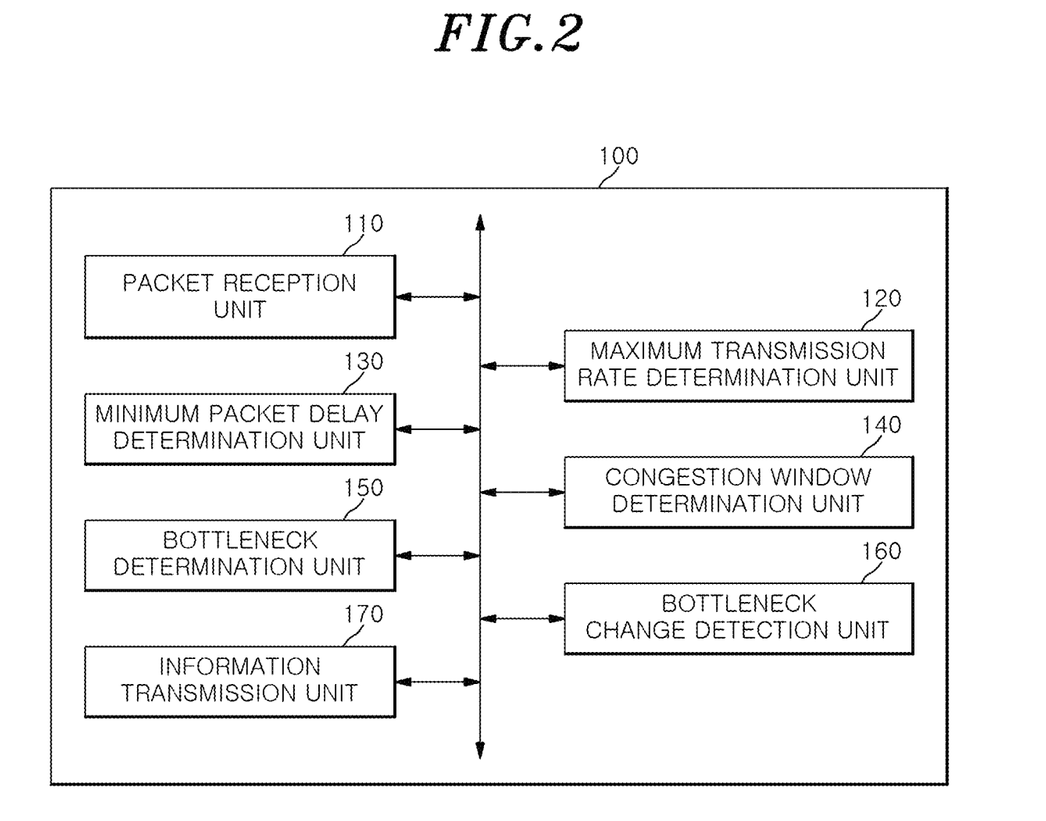
FIG. 2 shows an example of a functional configuration of a congestion control apparatus according to an embodiment of the present disclosure.

FIG. 2 shows an example of a functional configuration of the congestion control apparatus according to the embodiment of the present disclosure. More specifically, FIG. 2 explains a specific example of the functional configuration of the congestion control apparatus included in the receiver 40 shown in FIG. 1. The term " . . . part" or the like described below denotes a unit for performing at least one function or operation, and can be implemented by hardware, software, or combination of hardware and software.

Referring to FIG. 2, the congestion control apparatus 100 may include a packet reception unit 110, a maximum transmission rate determination unit 120, a minimum packet delay determination unit 130, a congestion window determination unit 140, a bottleneck determination unit 150, a bottleneck change detection unit 160, and an information transmission unit 170.

The packet reception unit 110 can receive a packet from the transmitter 10. More specifically, the packet reception unit 110 can receive a packet transmitted from the transmitter 10 in the unit of a frame for a time interval. Here, the packet may indicate a unit of data transmission that is provided to make the transmission through the network easier. The data can be transmitted in the unit of packet from the transmitter 10 to the receiver 40. A frame is a unit of time for distinguishing the total time in which the communication takes place on the cellular network. The frame may be referred to as a time slot, a cellular network frame, or the like depending on circumstances.

In some cases, the packet reception unit 110 can receive a plurality of packets in one frame. Hereinafter, they will be referred to as a singular term "packet", for convenience of description. However, the concept of the present disclosure is not limited thereto.

The packet reception unit 110 can receive a packet from the transmitter 10 and analyze various information of the packet. For example, the packet reception unit 110 can analyze the amount of data included in the packet, a time stamp at which the packet is received, the delay time of the packet, the value of the minimum packet delay, the congestion window estimate, and the like.

The maximum transmission rate determination unit 120 can determine the maximum transmission rate of the received packet. The maximum transmission rate determination unit 120 can determine the maximum transmission rate by analyzing the scheduling of the cellular network downlink frame of the received packet. Here, the maximum transmission rate may include a first maximum transmission rate related to a maximum transmission capacity that is achievable for the given receiver 40 and a second maximum transmission rate related to a maximum transmission capacity that is achievable for the given mobile cellular network related to the reception of the packet.

The maximum transmission rate determination unit 120 can determine the first maximum transmission rate using a unit of a cellular network frame, an index set of sub-frames allocated to the cellular network frame, and an amount of data received by each sub-frame. The congestion window determination unit 140 to be described later can use the first maximum transmission rate to determine the characteristics of the congestion window.

The maximum transmission rate determination unit (120) can determine the second maximum transmission rate using a unit of a cellular network frame, an index set of sub-frames allocated to the cellular network frame, an amount of data received by each sub-frame, and a time interval between the last packet and the first packet received in the sub-frame. The second maximum transmission rate can be used to allow the bottleneck determination unit 150 to be described later to determine the bottleneck link.

A specific example of an equation for determining the first maximum transmission rate and the second maximum transmission rate will be described later with reference to FIG. 4.

The minimum packet delay determination unit 130 can determine the minimum packet delay of the received packet. More specifically, the minimum packet delay determination unit 130 can calculate the packet delay and the average packet delay based on cellular network uplink characteristics. The minimum packet delay determination unit 130 can determine the minimum packet delay using the delay time and the average packet delay. The specific example of the equation for determining the minimum packet delay will be described later with reference to FIG. 5.

The congestion window determination unit 140 can determine the characteristics of the congestion window of the next packet to be received from the transmitter 10 based on the maximum transmission rate and the minimum packet delay. Here, the characteristics of the congestion window of the next packet may include the number of one or more packets transmitted at one time by the transmitter 10 in a next time interval, i.e., in a next frame.

More specifically, the congestion window determination unit 140 can determine the characteristics of the congestion window of the next packet based on the maximum transmission rate, the minimum packet delay, the actual transmission rate, the actual packet delay, and the characteristics of the congestion window of the received packet. For example, the congestion window determination unit 140 can determine the characteristic of the congestion window of the next packet based on the following Eq. (1).

Eq. (1)
$$w_{i+1} = (1-\gamma) \cdot w_i + \gamma\left(\frac{mRE_i}{R_i} \cdot w_i + \alpha\left(1 - \frac{T_i}{MTE_i}\right)\right) \quad \text{Eq. (1)}$$

In Eq. (1), $w_{i+1}$ indicates the characteristics of the congestion window of the next packet, i.e., the number of packets received in an $i+1^{th}$ frame (or time frame); $w_i$ indicates the characteristics of the congestion window of the currently received packet, i.e., the number of packets received in an $i^{th}$ frame; $mRE_i$ indicates the minimum packet delay at the time of receiving the packet in the $i^{th}$ frame; $\gamma$ and $\alpha$ indicate predetermined constants; $MTE_i$ indicates the maximum transmission rate of the packet in the $i^{th}$ frame; $R_i$ indicates the recent packet delay of the packet in the $i^{th}$ frame; and $T_i$ indicates the actual transmission rate of the packet in the $i^{th}$ frame.

The bottleneck determination unit 150 can estimate a bandwidth delay product (BDP) based on the second maximum transmission rate determined by the maximum transmission rate determination unit 120. The estimation of the bandwidth delay product is apparent for those skilled in the art, and thus will be omitted.

The bottleneck determination unit 150 can determine the bottleneck link by comparing the BDP and the congestion window.

If the value obtained by dividing the size of the congestion window of the received packet by the minimum packet delay is greater than the maximum transmission rate provided by the mobile cellular network, i.e., the second maximum transmission rate, the bottleneck determination unit 150 can determine that the bottleneck link is the cellular network. If the value obtained by dividing the characteristics of the congestion window of the received packet by the minimum packet delay is smaller than the maximum transmission rate provided by the mobile communication network, the bottleneck determination unit 150 can determine that the bottleneck link is the wired network.

The bottleneck change detection unit 160 can identify movement of the bottleneck. For example, the bottleneck change detection unit 160 can identify whether the bottleneck moves from the cellular network to the wired network or from the wired network to the cellular network.

The information transmission unit 170 can transmit the information on the characteristics of the congestion window of the next packet which is determined by the congestion window determination unit 140 and included in the ACK to the transmitter 10. More specifically, the information transmission unit 170 can determine whether or not the bottleneck link is the cellular network, and then transmit the information on the characteristics of the congestion window to the transmitter 10 when the bottleneck link is the cellular network. When the bottleneck link is the wired network, the information transmission unit 170 can wait until the bottleneck link is the cellular network without transmitting the information on the characteristics of the congestion window to the transmitter 10.

In that case, the receiver 40 can control the congestion using the congestion control method according to the embodiment of the present disclosure only when the bottleneck link is the cellular network. If the bottleneck is formed at the wired network, the transmitter 10 can control the congestion using a commonly used loss-based congestion control method. This is because when the bottleneck exists in the wired network, it may be more efficient to compete with other flows depending on the conventional loss-based congestion control method. Accordingly, the congestion control apparatus 100 according to the embodiment of the present disclosure can guarantee the maximum transmission rate and the minimum packet delay by controlling the congestion in a most efficient manner depending on the state of the network environment.

When the bottleneck change detection unit 160 identifies the shift of the bottleneck from the cellular network to the wired network, the information transmission unit 170 can provide the information on the characteristics of the congestion window which is determined by the congestion window determination unit 140 and included in the ACK to the transmitter 10. Accordingly, it is possible to prevent instantaneous packet loss that may occur when the bottleneck link changes.

In some cases, the information transmission unit 170 can provide the information on the characteristics of the congestion window of the next packet which is determined by the congestion window determination unit 140 and included in the ACK to the transmitter 10 regardless of the operations of the bottleneck determination unit 150 and the bottleneck change detection unit 160.

The transmitter 10 can control a packet (hereinafter, referred to as "next packet") to be transferred in a next frame based on the information on the characteristics of the congestion window. More specifically, the transmitter 10 can identify the received ACK and transmit the next packet to the receiver 40 depending on the characteristics of the congestion window expressed by the ACK. The control of the congestion window of the transmitter 10 is apparent to those skilled in the art, and thus will be omitted.

Although it is not specifically illustrated, the receiver 40 may further include a bottleneck determination device. In that case, the bottleneck determination device may include a packet reception unit 110, a maximum transmission rate determination unit 120, a bottleneck determination unit 150, and a bottleneck change detection unit 160. At least a part of the configuration of the bottleneck determination device may be shared with the congestion control apparatus 100 or may be provided as an additional component for performing the same function in the bottleneck determination device.

Figure 3:
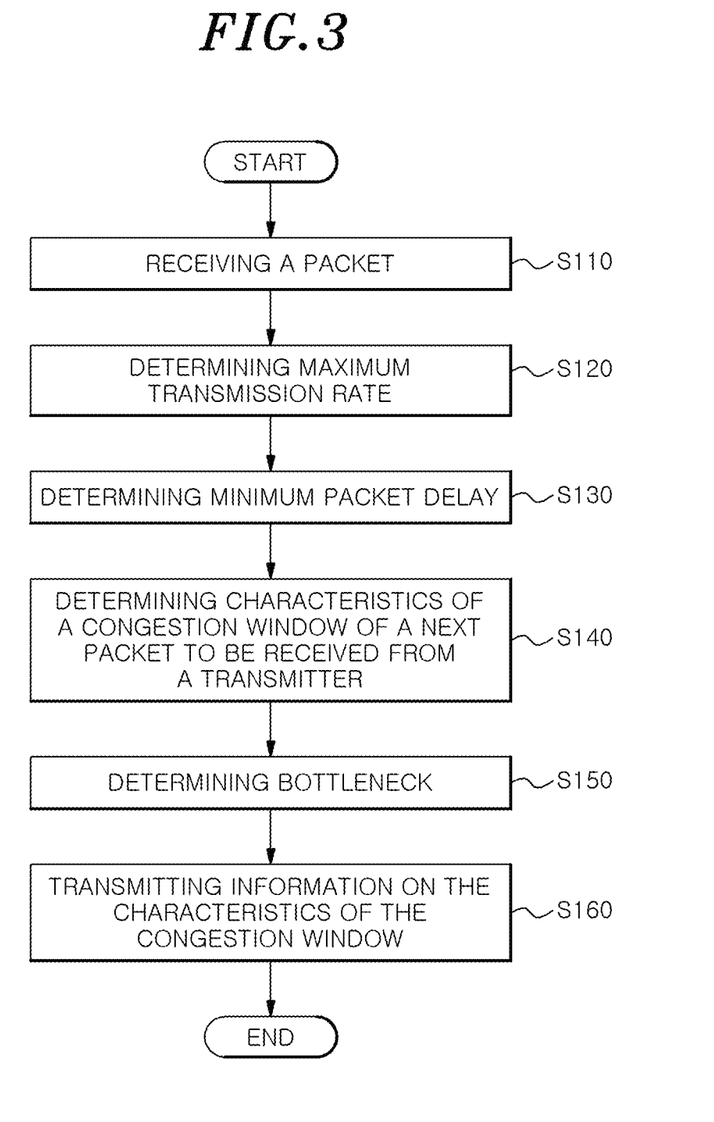
FIG. 3 shows an example of each step of the congestion control method according to the embodiment of the present disclosure.

FIG. 3 shows an example of each step of the congestion control method according to the embodiment of the present disclosure. Hereinafter, each step of the congestion control method related to the configuration of the congestion control apparatus 100 of the receiver 40 which is shown in FIG. 2 will be described with reference to FIG. 3.

Referring to FIG. 3, the packet reception unit 110 can receive a packet (S110). More specifically, the packet reception unit 110 can receive a packet transmitted from the transmitter 10 in the unit of a frame for a time interval.

The maximum transmission rate determination unit 120 can determine the maximum transmission rate of the received packet (S120). The maximum transmission rate determination unit 120 can determine the maximum transmission rate by analyzing the scheduling of the cellular network downlink frame of the received packet. Here, the determined maximum data transmission rate may include a first maximum transmission rate related to a maximum transmission capacity that is achievable for the given receiver 40 and a second maximum transmission rate related to a maximum transmission capacity that is achievable for the given mobile cellular network related to the reception of the packet.

The minimum packet delay determination unit 130 can determine the minimum packet delay of the received packet (S130). More specifically, the packet delay determination unit 130 can calculate the actual packet delay and the average packet delay based on the characteristics of the cellular network uplink. The minimum packet delay determination unit 130 can determine the minimum packet delay using the calculated packet delay and the calculated average packet delay.

The congestion window determination unit 140 can determine the characteristics of the congestion window of the next packet to be received from the transmitter 10 based on the maximum transmission rate and the minimum packet delay (S140). More specifically, the congestion window determination unit 140 can determine the characteristics of the congestion window indicating the number of packets to be transmitted from the transmitter 10 to the receiver 40 in the next frame based on the maximum transmission rate and the minimum packet delay.

The bottleneck determination unit 150 can determine the bottleneck using the second maximum transmission rate related to the maximum transmission capacity that is achievable for the given mobile cellular network which is determined by the maximum transmission rate determination unit 120 (S150). More specifically, the bottleneck determination unit 150 can estimate the BDP using the second maximum transmission rate and determine the bottleneck by comparing the BDP and the congestion window.

In some cases, the bottleneck change detection unit 160 can identify whether or not the bottleneck changes. For example, the bottleneck change detection unit 160 can identify whether the bottleneck link shifts from the wired network to the cellular network or from the cellular network to the wired network.

The information transmission unit 170 can transmit the information on the characteristics of the congestion window to the transmitter 10 (S160). The information transmission unit 170 can transmit the information on the characteristics of the congestion window to the transmitter 10 when the bottleneck is in the cellular network. If the bottleneck is not in the cellular network, the information transmission unit 170 can repeat the above-described steps until the bottleneck exists in the cellular network.

Figure 4:
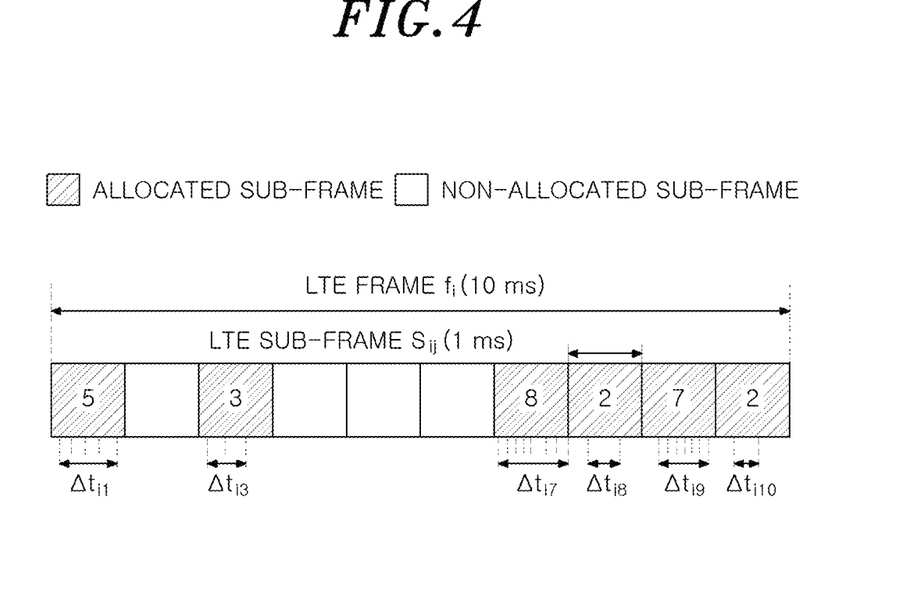
FIG. 4 explains a method for determining a maximum transmission rate of the congestion control method according to an embodiment of the present disclosure.

FIG. 4 explains a method for determining a maximum transmission rate of the congestion control method according to an embodiment of the present disclosure.

More specifically, FIG. 4 conceptually shows an example of a cellular downlink frame in which a packet is transmitted/received. As can be seen from FIG. 4, packets may be allocated on a cellular network sub-frame basis or may be empty depending on resource allocation scheduling. The congestion control apparatus 100 according to the embodiment of the present invention can measure the maximum transmission rate in two aspects using the resource allocation structures and use them for congestion control. At this time, the maximum data transmission rates measured in two aspects may be the first maximum transmission rate and the second maximum transmission rate described with reference to FIGS. 2 and 3.

More specifically, for cellular networks, if the frame length is 10 ms and the cellular network frame is divided into 10 cellular network sub-frames, the maximum transmission rate determination unit 120 can determine the first maximum transmission rate that is the maximum transmission rate that is achievable for the given receiver 40 using the following Eq. (2).

$$F(f_i) = \frac{\sum_{j \in S(f_i)} b_{ij}}{\text{rf\_length}} \quad \text{Eq. (2)}$$

In Eq. (2), rf_length indicates a radio frame length of given cellular network, $F(f_i)$ indicates a first maximum rate of an $i^{th}$ network frame; $b_{ij}$ indicates a byte (the amount of data) received by a $j^{th}$ cellular network sub-frame in the case of dividing the $i^{th}$ cellular network frame $f_i$ into 10 cellular network sub-frames; and $S(f_i)$ indicates an index set of sub-frames allocated to the cellular network frame $f_i$. The maximum transmission rate determination unit 120 can estimate the maximum rate that can be allocated to the next frame using Eq. (2).

For non-cellular networks including wired networks and Wi-fi, which does not have radio frame, F(•) function should return appropriate value considering given network type.

First maximum transmission rate can be redetermined as different form reflecting the characteristics of non-cellular networks. Eq. (3) is designed to support Wi-fi, Eq. (4) is designed to support wired networks. Note that equation keep use the structure of cellular radio frame for the compatibility issues with the cellular one.

$$F(f_i) = \frac{\sum_{j \in S(f_i)} b_{ij}}{|S(f_i)|} \quad \text{Eq. (3)}$$

In Eq. (3), $b_{ij}$ indicates a byte (the amount of data) received by a $j^{th}$ network sub-frame in the case of dividing the $i^{th}$ network frame $f_i$ into 10 network sub-frames; and $S(f_i)$ indicates an index set of sub-frames allocated to the network frame $f_i$.

$$F(f_i) = \max_{j \in S(f_i)} \frac{b_{ij}}{\Delta t_{ij}} \quad \text{Eq. (4)}$$

In Eq. (4), $b_{ij}$ indicates a byte (the amount of data) received by a $j^{th}$ network sub-frame in the case of dividing the $i^{th}$ network frame $f_i$ into 10 network sub-frames; $\Delta t_{ij}$ indicates a time interval between the last packet and the first packet received in the $j^{th}$ cellular network sub-frame of the $i^{th}$ network frame $f_i$; and $S(f_i)$ indicates an index set of sub-frames allocated to the network frame $f_i$.

If the length of the cellular network frame is 10 ms and the cellular network frame is divided into 10 cellular network sub-frames, the maximum transmission rate determination unit 120 can determine the second maximum transmission rate that is the maximum transmission rate that can be provided by the mobile cellular network using the following Eq. (5).

$$C(f_i) = \frac{\sum_{j \in S(f_i)} \frac{b_{ij}}{\Delta t_{ij}}}{|S(f_i)|} \qquad \text{Eq. (5)}$$

In Eq. (5), $C(f_i)$ indicates the second maximum rate of the $i^{th}$ cellular network; $b_{ij}$ indicates a byte received by the $j^{th}$ cellular network sub-frame of the $i^{th}$ cellular network frame $f_i$; $\Delta t_{ij}$ indicates a time interval between the last packet and the first packet received in the $j^{th}$ cellular network sub-frame of the $i^{th}$ cellular network frame $f_i$; and $S(f_i)$ indicates an index set of sub-frames allocated to the cellular network frame $f_i$. Here, the index set may indicate the set of sub-frames to which packets are allocated. The maximum transmission rate determination unit 120 can estimate the entire bandwidth of the cellular network channel using Eq. (5).

Figure 5:
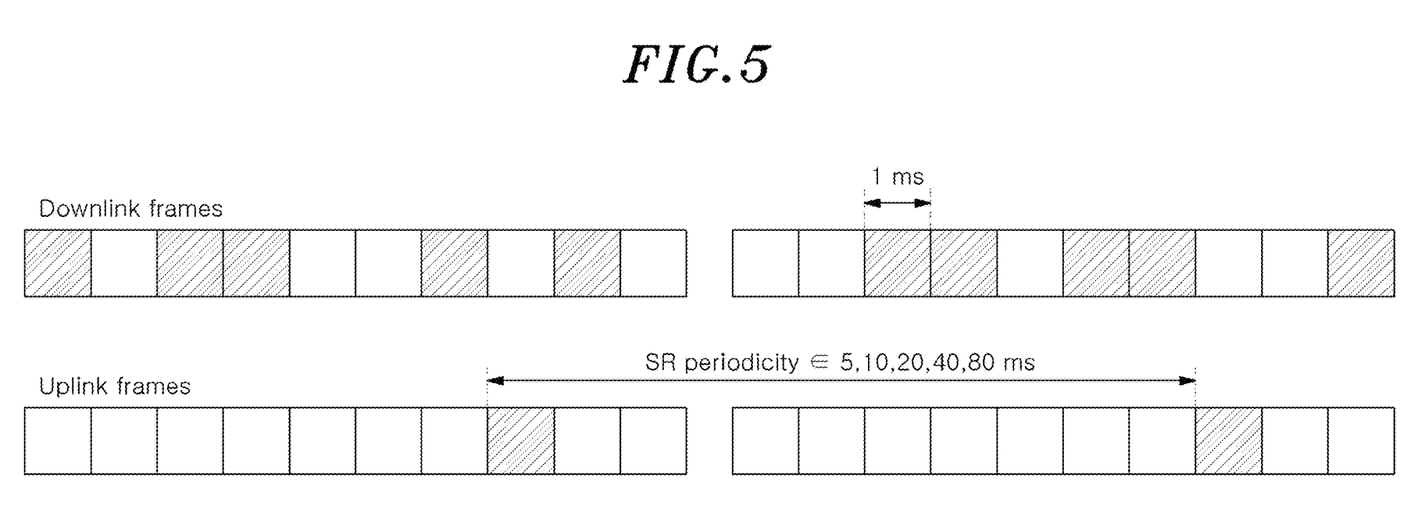
FIG. 5 explains a method for determining a minimum packet delay of the congestion control method according to an embodiment of the present disclosure.

FIG. 5 explains a method for determining a minimum packet delay of the congestion control method according to an embodiment of the present disclosure. More specifically, FIG. 5 shows the concept of a scheduling request (SR) cycle used in the mobile communication network uplink.

Referring to FIG. 5, the minimum packet delay determination unit 130 can calculate the SR cycle using a delay time in the unit of packet which can be measured by the receiver 40. More specifically, the delay time determination unit 130 can calculate the SR period using the following Eq. (6).

$$mRE_i = mpRTT + D(2 \cdot (apRTT - mpRTT)) \qquad \text{Eq. (6)}$$

For cellular networks, in Eq. (6), D(•) may be a function for determining a best matching SR period among "5 ms, 10 ms, 20 ms, 40 ms, 80 ms". More specifically, D(2·(apRTT−mpRTT)) is a function for determining a value having a smallest difference from the value determined by 2·(apRTT−mpRTT) among "5 ms, 10 ms, 20 ms, 40 ms, 80 ms". If the value determined by 2·(apRTT−mpRTT) is 18 ms, the SR cycle can be determined to be 20 ms. apRTT may be an average value of round trip time (RTT) of the packet. mpRTT may be a minimum value of round trip time of the packet.

For non-cellular networks including wired networks and Wi-fi, which does not have predetermined amount of fixed uplink scheduling time. So, in this case, D(2·(apRTT−mpRTT)) may return 2·(apRTT−mpRTT) value itself.

The minimum packet delay determination unit 130 can more accurately determine the minimum packet delay by correcting the delay time related to the previously generated ACK by adding mpRTT to the SR cycle determined by D(2·(apRTT−mpRTT)) using Eq. (6).

The congestion control apparatus 100 according to the embodiment of the present disclosure can control the congestion by the operation of the receiver 40 without modifying the transmitter 10. Further, the congestion control apparatus 100 according to the embodiment of the present disclosure can adaptively control the congestion by controlling the size of the congestion window (or the receive window) while considering the position of the bottleneck link.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method, performed by a receiver, for controlling congestion, comprising:
   receiving packets from a transmitter;
   determining a maximum transmission rate of the received packets;
   determining a minimum packet delay of the received packets;
   determining characteristics of a congestion window of next packets to be received from the transmitter based on the maximum transmission rate and the minimum packet delay; and
   transmitting information on the determined characteristics of the congestion window to the transmitter, estimating a bandwidth delay product (BDP) based on the determined maximum rate; and
determining a bottleneck based on the BDP and the characteristics of the congestion window of the received packets,
wherein said transmitting the information on the determined characteristics of the congestion window of the next packets includes:
determining whether or not the identified bottleneck is included in a cellular network; and
transmitting the information on the determined characteristics of the congestion window to the transmitter when the identified bottleneck is included in the cellular network.

2. The method of claim 1, wherein said determining the maximum transmission rate includes:
determining the maximum transmission rate based on analyzing scheduling of cellular network downlink frames of the received packets.

3. The method of claim 2, wherein said determining the maximum transmission rate includes:
determining, based on analyzing the scheduling of the cellular network downlink frames, a first maximum transmission rate related to a maximum transmission capacity that is achievable for a given receiver and a second maximum transmission rate related to a maximum transmission capacity that is achievable for a given mobile cellular network related to the reception of the packets.

4. The method of claim 3,
wherein the first maximum transmission rate is determined by using a unit of a cellular network frame, an index set of sub-frames allocated to the cellular network frame, and a byte received by each sub-frame, and
wherein the second maximum transmission rate is determined by using a unit of the cellular network frame, an index set of sub-frames allocated to the cellular network frame, a byte received by each sub-frame, and a time in which the byte is received in the sub-frame.

5. The method of claim 1, wherein said determining the minimum packet delay includes:
calculating a packet delay and an average packet delay based on cellular network uplink characteristics; and
determining the minimum packet delay using the packet delay and the average packet delay.

6. The method of claim 1, wherein the characteristics of the congestion window include a size of the congestion window,
wherein said determining the congestion window of the next packets includes:
determining the characteristics of the congestion window of the next packets based on the maximum transmission rate, the minimum packet delay, an actual transmission rate, an actual packet delay, and the characteristics of the congestion window of the received packets.

7. The method of claim 1, wherein said determining characteristics of the congestion window includes:
determining the characteristics of the congestion window of the next packets based on the following equation:

$$w_{i+1} = (1-\gamma) \cdot w_i + \gamma\left(\frac{mRE_i}{R_i} \cdot w_i + \alpha\left(1 - \frac{T_i}{MTE_i}\right)\right),$$

wherein $w_{i+1}$ indicates the characteristics of the congestion window of the next packets; $w_i$ indicates the characteristics of the congestion window of the received packets; $mRE_i$ indicates the minimum packet delay; $\gamma$ and $\alpha$ indicate predetermined constants; $MTE_i$ indicates the maximum transmission rate; $R_i$ indicates the recent packet delay of the packet in the $i^{th}$ frame; and $T_i$ indicates an actual transmission rate of the received packets.

8. The method of claim 1, wherein the transmitter controls the next packets based on the information on the characteristics of the congestion window.

9. The method of claim 1, wherein said transmitting the information on the determined characteristics of the congestion window includes:
transmitting the determined characteristics using acknowledgment (ACK) of the received packets to the transmitter,
wherein the acknowledgment includes the determined characteristics.

10. An apparatus for controlling congestion, comprising:
a packet reception unit configured to receive packets from a transmitter;
a maximum rate determination unit configured to determine a maximum transmission rate of the received packets;
a minimum packet delay determination unit configured to determine a minimum packet delay of the received packets;
a congestion window determination unit configured to determine characteristics of a congestion window of next packets to be received from the transmitter based on the maximum transmission rate and the minimum packet delay; and
an information transmission unit configured to transmit information on the determined characteristics of the congestion window to the transmitter,
wherein:
a bandwidth delay product (BDP) is estimated by the apparatus based on the determined maximum rate; and
a bottleneck is determined by the apparatus based on the BDP and the characteristics of the congestion window of the received packets,
wherein when the information transmission unit transmits the information on the determined characteristics of the congestion window of the next packets includes:
whether or not the identified bottleneck is included in a cellular network is determined by the apparatus; and
the information on the determined characteristics of the congestion window is transmitted by the apparatus to the transmitter when the identified bottleneck is included in the cellular network.

11. The apparatus of claim 10, wherein the maximum transmission rate determination unit determines the maximum transmission rate by analyzing scheduling of cellular network downlink frames.

12. The apparatus of claim 10, wherein the minimum packet delay determining unit calculates a packet delay and an average packet delay based on cellular network uplink characteristics and determines the minimum packet delay using the packet delay and the average packet delay.

13. The apparatus of claim 10, wherein the characteristics of the congestion window include a size of the congestion window, and the congestion window determination unit determines the characteristics of the congestion window of the next packets based on the maximum transmission rate, the minimum packet delay, an actual transmission rate, an actual packet delay, and the characteristics of the congestion window of the received packets.

14. The apparatus of claim 10, wherein the congestion window determination unit determines the characteristics of the congestion window of the next packets based on the following equation:

$$w_{i+1} = (1-\gamma) \cdot w_i + \gamma\left(\frac{mRE_i}{R_i} \cdot w_i + \alpha\left(1 - \frac{T_i}{MTE_i}\right)\right),$$

wherein $w_{i+1}$ indicates the characteristics of the congestion window of the next packet; $w_i$ indicates the characteristics of the congestion window of the received packets; $mRE_i$ indicates the minimum packet delay; $\gamma$ and $\alpha$ indicate predetermined constants; $MTE_i$ indicates the maximum transmission rate; $R_i$ indicates the recent packet delay of the packet in the $i^{th}$ frame; and $T_i$ indicates an actual transmission rate of the received packets.

* * * * *